United States Patent [19]

Skinner

[11] 4,193,668
[45] Mar. 18, 1980

[54] MIRROR CONSTRUCTION AND METHOD FOR MAKING THE SAME

[75] Inventor: James R. Skinner, Saratoga, Calif.

[73] Assignee: M. U. Engineering & Manufacturing, Inc., Mountain View, Calif.

[21] Appl. No.: 920,139

[22] Filed: Jun. 28, 1978

[51] Int. Cl.² .............................................. G02B 17/00
[52] U.S. Cl. .................... 350/281; 350/288; 427/163
[58] Field of Search ........ 427/163; 350/281, 302-304, 350/145, 97, 105, 103, 288, 281, 302

[56] References Cited

U.S. PATENT DOCUMENTS

| | | | |
|---|---|---|---|
| 2,582,651 | 1/1952 | Peterson | 350/304 |
| 3,540,978 | 11/1970 | Ames | 350/108 |
| 3,726,586 | 4/1973 | Smialkowski et al. | 350/281 |
| 3,740,122 | 6/1973 | Stern | 350/281 |
| 4,023,889 | 5/1977 | Eagon et al. | 350/105 |

FOREIGN PATENT DOCUMENTS 2490748  9/1975  Fed. Rep. of Germany ........... 350/303

*Primary Examiner*—John K. Corbin
*Assistant Examiner*—B. Wm. de los Reyes
*Attorney, Agent, or Firm*—Flehr, Hohbach, Test, Albritton & Herbert

[57] ABSTRACT

Mirror construction formed of a wedge of plastic having two planar surfaces with a reflecting mirror formed on one of the surfaces and an abrasion resistant coating formed on the other of said surfaces.

Method for injection molding a mirror in which the core portion of the mirror is molded from plastic and simultaneously there is laminated thereon on one side a plastic film carrying an abrasion resistant coating and on the opposite side a plastic film carrying a reflective surface so that after curing of the core, the three separate parts can be removed as an integral unit.

8 Claims, 8 Drawing Figures

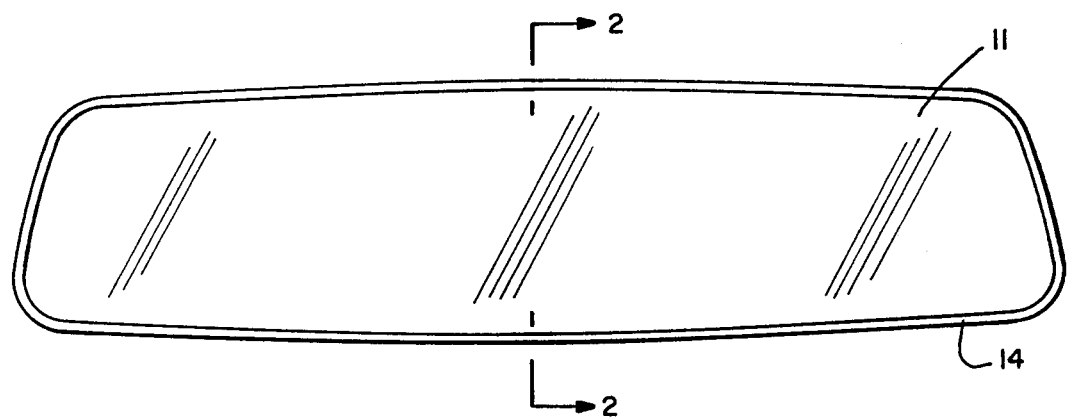
FIG.—1
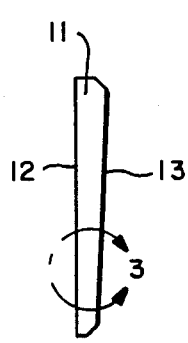
FIG.—2
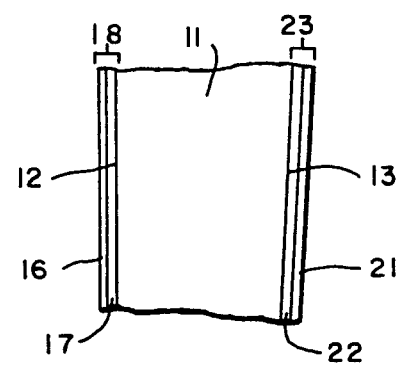
FIG.—3
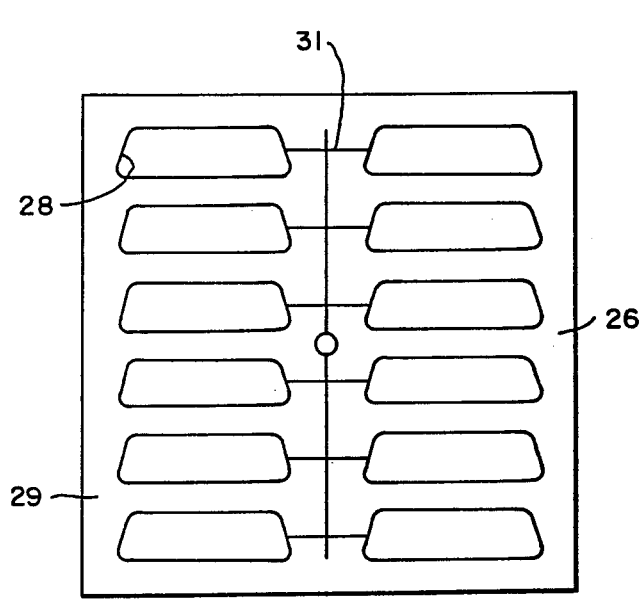
FIG.—4
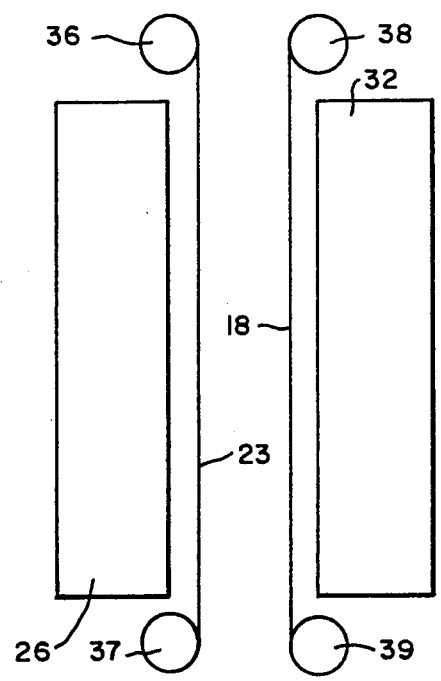
FIG.—5

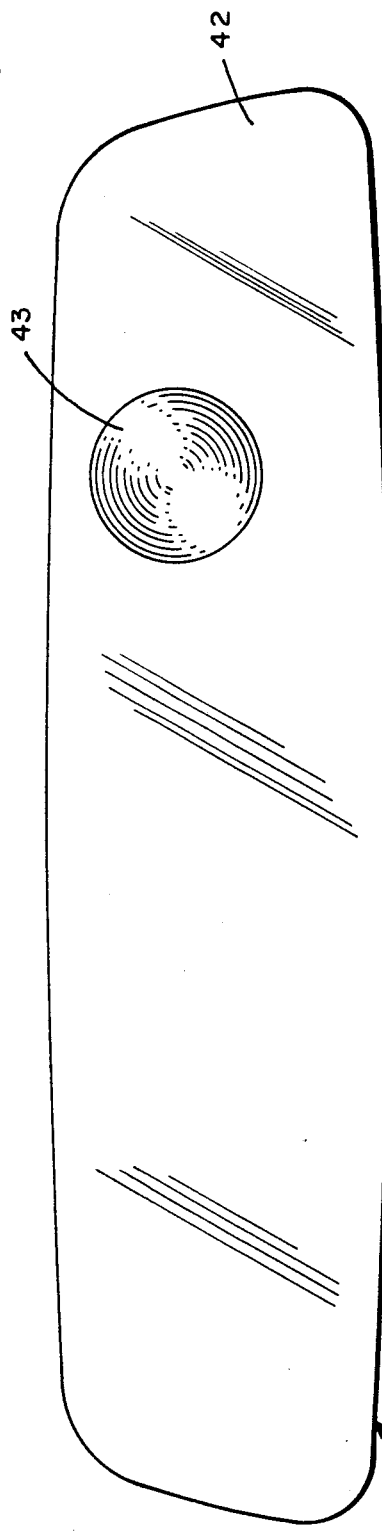
FIG.—6
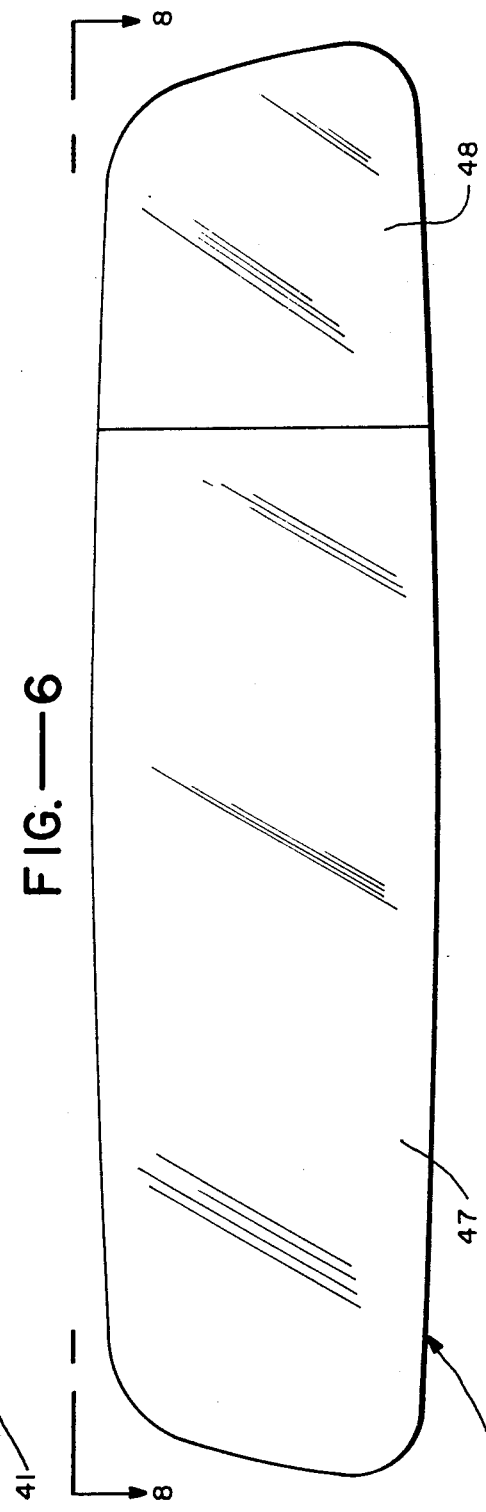
FIG.—7
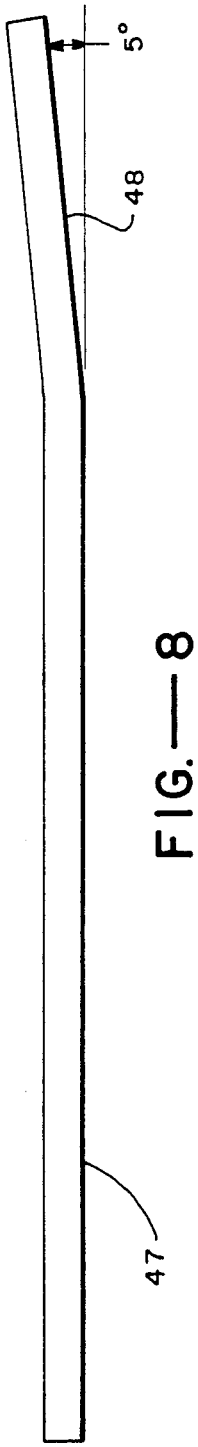
FIG.—8

MIRROR CONSTRUCTION AND METHOD FOR MAKING THE SAME

BACKGROUND OF THE INVENTION

Mirrors of various types, including rear view mirrors for automobiles, have been provided. However, at the present time with increased emphasis on gasoline mileage, there is a need for mirrors which have a lesser weight than those conventionally formed of glass. In addition, there is the desirability of increasing safety by avoiding the hazards from splintering glass mirrors in case of an accident. There is, therefore, need for a new and improved mirror construction and a method for making the same.

SUMMARY OF THE INVENTION AND OBJECTS

The mirror construction consists of a member formed of plastic having two planar surfaces. A reflecting layer is carried by one of the surfaces and an abrasion resistant coating is carried by the other of the surfaces. In rear view mirrors for automobiles, one of the surfaces is inclined at a small angle with respect to the other surface.

In the method of making the mirror construction, the metallic layer and the abrasion resistant coating both are carried by separate plastic films which are bonded to the plastic core utilized for the mirror during the time that the plastic core is being formed in the mold so that the three pieces emerge as a single integral part from the mold.

In general, it is an object of the present invention to provide a mirror construction and method in which essentially solely plastic is utilized in the formation of the mirror.

Another object of the invention is to provide a mirror construction of the above character which is particularly adaptable to rear view mirrors for automobiles.

Another object of the invention is to provide a mirror construction of the above character which has substantially reduced weight over a comparable glass mirror.

Another object of the invention is to provide a mirror construction of the above character which has additional safety features.

Another object of the invention is to provide a mirror construction of the above character which can be readily fabricated.

Additional objects and features of the invention will appear from the following description in which the preferred embodiment is set forth in detail in conjunction with the accompanying drawings.

BRIEF DESCRIPTION OF THE DRAWINGS

FIG. 1 is a front elevational view of a construction incorporating the present invention.

FIG. 2 is a cross sectional view taken along the line 2—2 of FIG. 1.

FIG. 3 is an enlarged partial cross sectional view of the mirror construction shown in FIG. 1.

FIG. 4 is a diagrammatic illustration of the method utilized in making the mirror construction which is shown in FIG. 1.

FIG. 5 is a plan view of the open face of the multi-cavity mold utilized in making the mirror construction in the manner shown in FIG. 4.

FIG. 6 is a front elevational view of another embodiment of the mirror construction incorporating the present invention having a spherical portion incorporated therein.

FIG. 7 is still another embodiment of the mirror construction incorporating the present invention having an angularly offset portion to increase the field of view.

FIG. 8 is a view of the mirror construction shown in FIG. 7 looking along the line 8—8 of FIG. 7.

DESCRIPTION OF THE PREFERRED EMBODIMENTS

The mirror construction incorporating the present invention consists of a member 11 in the form of a wedge which is made of plastic. A butyrate material has been selected for forming the member 11 which constitutes the core of the construction hereinafter described. It should be appreciated that, if desired, other plastic materials can be utilized such as acrylic or polycarbonate materials. The member is provided with planar surfaces 12 and 13 with surface 12 being the rear surface and surface 13 being the front surface. When the mirror is to be utilized as an interior rear view mirror as, for example, in an automobile, the front surface 13 is inclined at a slight angle with respect to the rear surface 12 as, for example, an angle of 3° to form a wedge to permit the same to be utilized during day and night driving as hereinafter described. The mirror has a generally rectangular configuration in front elevation with the corner being rounded as shown particularly in FIG. 1 with the front surface 13 being provided with a beveled edge 14.

A layer 16 of a suitable reflecting material such as aluminum is carried by the back surface 12. In the present invention, the layer 16 is carried by a layer or film 17 of plastic so that there is provided a laminate consisting of the layer or film of plastic with the reflecting layer 16 carried thereby. This laminate 18 is bonded to the surface 12 in a manner hereinafter described with the plastic layer of film 17 facing the surface 12.

An abrasion resistant layer 21 is carried by the front surface 13. In the present invention, it is also carried by a layer or film 22 of plastic to provide a laminate 23 which is secured to the front surface by having the layer of film 22 facing the surface 13 and being bonded thereto in a manner hereinafter described. In order to facilitate the bonding operation, it is preferable that the layers of films 17 and 22 be formed of substantially the same material as the core 11. Thus, since the core is formed of a butyrate material, it is preferable that the layers of films 17 and 22 also be formed of a butyrate material. If the core 11 is formed of a different plastic material, it is preferable that the layers or films 17 and 22 also be formed of the same material.

The laminates 18 and 23 can have any desired thickness ranging from five thousandths to fifteen thousandths of an inch in thickness. The laminate 18 is preferably formed of a layer of cast cellulose acetate butyrate which an aluminum layer provided on one surface with the aluminum layer having a thickness that will provide at least 88% reflectivity. It should be appreciated that, if desired, other suitable reflecting materials such as silver and the like can be utilized in place of aluminum to provide the reflecting surface. Such laminates can be obtained from a number of commercial sources.

The laminate 22 also is formed of a cast cellulose acetate butyrate with an anti-abrasion or abrasion resistant film laminated thereto. This laminate can be obtained from Minnesota Mining & Manufacturing.

The method of manufacture for the mirror construction which is shown in FIGS. 1, 2 and 3 is shown particularly in FIGS. 4 and 5. An injection molding machine of a conventional type is utilized which is capable of receiving molds. Thus, as shown in FIG. 4, there is provided first and second injection molds 26 and 27 in which mold 26 can be identified as a multi-cavity or cavity mold and mold 27 can be identified as a core mold. The multi-cavity mold 26 is provided with a plurality of recesses or cavities 28 which open through a planar surface 29. A runner structure 31 is provided in the mold 26 and is utilized for supplying plastic into the cavities as hereinafter described. The core mold 27 is provided with a planar surface 32 which is adapted to engage the surface 29 of the mold 26. The laminate 23 which carries the abrasion resistant layer 21 is provided on a supply reel 36 and extends between the two molds 26 and 27 and is taken up by a takeup reel 37. The laminate 23 is positioned in such a manner so that the abrasion resistant layer 21 faces the surface 29 of the mold 26. Similarly, the laminate 18 which carries the reflecting layer 16 is provided on a supply reel 28 and extends between the molds 26 and 27 and is taken up by a takeup reel 39. The laminate 18 is positioned in such a manner so that the reflecting layer 16 faces the surface 32 of the core mold 27. Thus, it can be seen that with respect to laminates 18 and 23, the plastic layer or films are facing each other.

During the injection molding process, when the molds are open, the laminates are advanced between the molds 26 and 27 so that new surface areas are presented to the mold. The molds are then clamped together and plastic material is introduced into the runners 31 between the laminates 18 and 23 to fill the cavities 28. By the application of heat and pressure thereafter, the plastic is secured in a conventional manner as, for example, by utilizing a temperature of 300°-400° F. and a curing time ranging from 1½ minutes to 2 minutes to cure the core 11 which is formed in the cavity and at the same time to bond the layers or films 17 and 22 of the laminates 18 and 23 to the core 11 to form an integral unit from the core and the two laminates. As soon as the curing operation has been completed, the two molds 26 and 27 can be opened and the completed parts can be removed from the cavities to provide a plurality of integral units or parts comprising the present invention. The same cycle is then repeated to produce additional parts.

With the method hereinbefore described, it can be seen that three separate parts are combined into a single integral unit or part simultaneously with the molding process hereinbefore described.

It should be appreciated that, if desired, separate steps can be utilized for bonding each of the laminates 18 and 23 to the core 11 which has been separately formed.

It has been found that rear view mirrors manufactured in accordance with the present method and utilizing the materials herein described represent approximately a 50% saving in weight over the weight of a corresponding mirror of the same size formed of glass. This is particularly important in days when energy conservation is important and weight reduction in automobiles facilitates increased mileage from fuels. The plastic mirror construction has an additional advantage in that it has safety features in that it is much safer in the event of accident. The plastic will not splinter and break during accidents and thus cause serious injuries.

Although the invention thus far described has principally been described in conjunction with rear view mirrors for automobiles, it should be appreciated that the invention is also useful for other mirror applications in which weight and safety are factors.

In FIG. 6 there is shown a mirror construction 41 similar to that hereinbefore described with the exception that the front planar surface 42 has been provided with a spherical portion 43 to make possible wide angle vision from this spherical portion. The use of plastic in such a manner is particularly advantageous in that the sperical portion 43 can be formed at the same time that the core for the mirror is being formed.

Another embodiment of the mirror construction is shown in FIG. 7 and as shown therein the mirror 46 has been provided with two front planar surfaces 47 and 48 in which surface 48 is to the right hand side of the mirror looking towards the mirror and is inclined at a suitable angle as, for example, at an angle of 5° with respect to the surface 47. This makes possible wider angle viewing by the user of the mirror. The construction of mirrors having such configurations also is facilitated by the use of plastic which can be readily molded into different shapes. In all of the embodiments described, it is readily apparent that the mirrors which are provided with a wedge-shaped core can be utilized for daylight and night driving. In daylight driving, the reflection is from the second surface provided by the reflecting layer carried by the laminate 18. In night driving, the mirror is tilted so that the relection is from the first surface of the mirror which causes a very substantial loss in reflectivity as, for example, a 90% loss so as to reduce glare from headlights of a vehicle to the rear.

It is apparent from the foregoing that there has been provided a new and improved mirror construction which has greatly reduced weight and which has improved safety features. In addition, there has been disclosed a method of manufacture for such a mirror construction in which it is possible to simultaneously form the mirror construction from three separate parts in injection molding equipment.

What is claimed is:

1. In a mirror construction, a transparent member formed of plastic having first and second planar surfaces, first and second transparent laminates formed of plastic film bonded respectively to said first and second surfaces of said member and providing outer plastic surfaces, a reflecting layer formed on one of said outer plastic surfaces and an abrasion resistant coating formed on the other of said outer plastic surfaces.

2. A construction as in claim 1 wherein said member is a cast cellulose acetate butyrate.

3. A construction as in claim 1 wherein said reflecting layer is formed of aluminum.

4. A construction as in claim 2 wherein said laminates have a thickness ranging from 5 to 15 thousandths.

5. A mirror construction as in claim 1 wherein said transparent member formed of plastic is provided with an integral spherical portion extending through the surface having an abrasion resistant coating formed thereon and in which the abrasion resistant coating covers said spherical portion.

6. A mirror construction as in claim 1 wherein said transparent member is formed of first and second portions integral with each other with each of the portions having two planar surfaces and with the corresponding surfaces of the two portions being inclined at an angle with respect to each other so as to provide a wider angle of view.

7. In a method for constructing a mirror by the use of injection molding equipment and cavity and core molds, providing a laminate of plastic film having first and second surfaces, forming a reflecting coating on the first surface of the laminate of plastic film, providing an additional laminate of plastic film having first and second surfaces, forming an abrasion resistant coating on the first surface of the additional laminate of plastic film, opening the molds so they are spaced apart, placing the laminate of a plastic film having the reflecting coating thereon between the cavity and core molds so that the reflecting coating faces the mold, placing the additional laminate of plastic film having the abrasion resistant coating thereon so it extends between the cavity and core molds with the abrasion resistant coating facing the surface of the mold so that the second plastic surfaces of the first named and additional laminates are facing each other, closing the molds, injecting plastic into the molds between the first named and additional laminates to fill the cavities in the molds, curing the plastic in the molds and bonding the first named and additional laminates to the plastic so that there is an integral unit formed from the plastic introduced into a cavity in the mold and the first named and additional laminates within the cavity, opening the molds and removing the cured unit so that there is provided a mirror construction which comprises a member formed of plastic and having an abrasion resistant coating on one side and a reflecting coating on the other side.

8. A method as in claim 7 in which the laminates are carried in rolls and are advanced between the molds when the molds are separated.

* * * * *